United States Patent [19]

English

[11] Patent Number: 4,462,063
[45] Date of Patent: Jul. 24, 1984

[54] PHOTOFLASH UNIT HAVING OPTICAL SYSTEM INCLUDING ASPHERIC LENS TO ENHANCE LIGHT OUTPUT

[75] Inventor: George J. English, Reading, Mass.
[73] Assignee: GTE Products Corporation, Stamford, Conn.
[21] Appl. No.: 341,420
[22] Filed: Jan. 21, 1982
[51] Int. Cl.³ ............................................. G03B 15/02
[52] U.S. Cl. ....................................... 362/11; 362/17; 362/240; 362/241; 362/308; 362/335; 431/365
[58] Field of Search ................... 362/11, 17, 240, 241, 362/308, 335; 431/365

[56] References Cited

U.S. PATENT DOCUMENTS

| | | | |
|---|---|---|---|
| 4,136,378 | 1/1979 | Chevali | 362/17 |
| 4,136,379 | 1/1979 | Chevali | 362/17 |
| 4,172,273 | 10/1979 | Schilling et al. | 362/17 |
| 4,234,906 | 11/1980 | Schindler | 362/17 |

*Primary Examiner*—Stephen J. Lechert, Jr.
*Attorney, Agent, or Firm*—Lawrence R. Fraley

[57] ABSTRACT

A photoflash unit employing an optical system or apparatus with improved center beam candle power seconds and zonal lumen seconds from the flash lamp therein, said unit also employing a minimized utilization ratio of lamp-to-package cross-sectional area. Each individual lamp capsule comprises a reflective element, a refractive element (lens), and at least one photoflash lamp (light source). The lens provides for lamp shred magnification so as to fill the cell (capsule) width to thus provide maximum transfer of light to the subject on axis. One embodiment has the light source fused (glued) to the reflector and lens while a second embodiment has an air interface between the source and the optical elements. In both embodiments, the lens is aspheric and substantially covers both the reflector and source.

20 Claims, 21 Drawing Figures

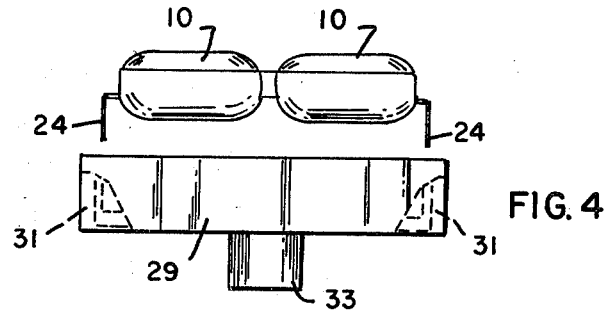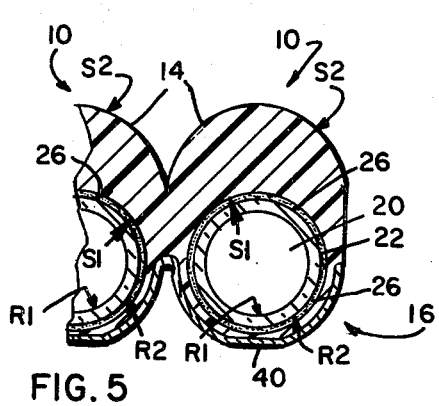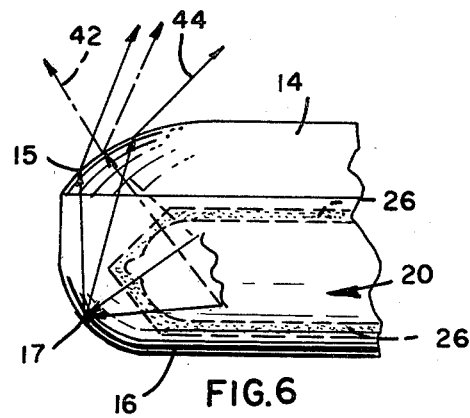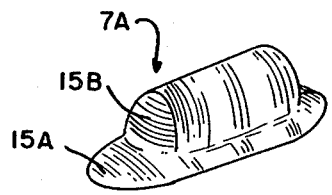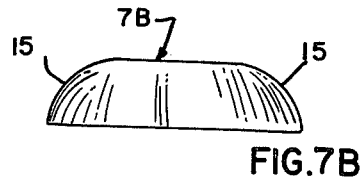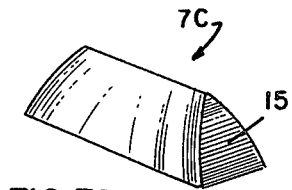

PHOTOFLASH UNIT HAVING OPTICAL SYSTEM INCLUDING ASPHERIC LENS TO ENHANCE LIGHT OUTPUT

TECHNICAL FIELD

The present invention relates in general to an optical system or apparatus with improved center beam light output and field illumination characteristics, and more particularly, pertains to an improved multilamp photoflash unit having an optimized utilization ratio of lamp-to-package cross-sectional area.

BACKGROUND

The present invention is directed to an optical system or apparatus for improving the center beam candle power seconds (axial intensity) and zonal lumen seconds (field illumination) of a flash lamp in a photoflash unit. This is accomplished with the use of a unique lens and reflector system for in particular providing an improvement in light distribution.

The use of a lens in association with a source and reflector can be found in early patents relating to lighting apparatus such as U.S. Pat. No. 1,805,690 (Dodge). The product illustrated in U.S. Pat. No. 1,805,690 employs a relatively large reflector in comparison with the light source and the lens. The apparatus is particularly described as one for controlling lateral divergence. The lens in this patent is connected directly to the light source (as part of the lamp's envelope) and not directly associated with the reflector. Examples of multilamp photoflash units employing prismatic light controlling means are shown in U.S. Pat. Nos. 3,993,896 (Wacker), 3,995,149 (Lukas), and 4,172,273 (Schilling, et al). The units described in these patents employ a forwardly disposed prism. The prism construction employed is substantially flat and, although it does provide some degree of light level distribution, there is a tendency, as mentioned in U.S. Pat. No. 4,172,273, to produce an intensity dip at the pattern center U.S. Pat. No. 3,993,896 employs a prism arrangement for compensating for lateral spreading of the light rays. However, none of the aforementioned patents provide a degree of improvement possible with the construction of the present invention, particularly the improvement of the center beam characteristics evidenced by the maintenance of a substantially uniform light distribution even at a substantial off-center deviation.

DISCLOSURE OF THE INVENTION

It is therefore an object of the present invention to provide a multilamp photoflash unit which is characterized by an improved center beam intensity distribution. In accordance with the invention there is an improvement in center beam candle power seconds and zonal lumen seconds of the flash lamp. In accordance with one embodiment of the invention, the gain of the optical system may be on the order of 2.5 times the intensity of the base bulb.

Another object of the present invention is to provide an optical system or apparatus with an improved light output that is achieved with a substantially smaller than common utilization ratio of lamp-to-package cross-sectional area.

A further object of the present invention is to provide an optical system or apparatus with improved light output which can be readily designed to either transmit light back through the source or around it depending upon certain dimensional factors relating to cell (lamp capsule) size.

Still another object of the present invention is to provide an optical system or apparatus with improved light output and in particular, characterized by improved end focusing to provide an improvement in light output of approximately 10–20 percent of the light over the field of view.

Another object of the present invention is to provide an optical system or apparatus with improved light output and providing maximum transfer of light to the subject on-axis along with an improvement in off-axis light output, for example, on the order of about at least 66 percent light output at a position approximately 20° off axis. By the term axis is understood to mean the optical axis of the defined lens component.

Still another object of the present invention is to provide an improved optical system as in accordance with the preceding objects and which can be manufactured relatively inexpensively, be provided in a compact and rugged multi-lamp unit and which lends itself readily to ease of manufacture.

To accomplish the foregoing and other objects of this invention, there is provided a photoflash unit having an improved optical system and apparatus, particularly one characterized by enhanced center beam candle power seconds and zonal lumen seconds of the flash lamp which constitutes part of the overall unit. With this invention, the gain that has been measured is on the order of 2.5 times the intensity of the base bulb (lamp). Furthermore, the improvements realized herein are achieved with the use of a smaller than usual utilization ratio of lamp-to-package cross-sectional area.

In accordance with one aspect of the present invention, there is provided a photoflash unit which is capable of being electrically activated when connected to a power source typically associated with a photographic camera. The unit comprises a photoflash light source (lamp) including a light-transmitting envelope and a pair of lead-in wires projecting therefrom and adapted for connection to the power source. A housing means is provided which is preferably of a premolded plastic material and has an opening for receiving the photoflash light source and further has means defining a back reflector surface. This reflector surface is preferably comparable in width to the width of the lamp with the light source being slightly narrower. Means are provided for securing the light source in the housing means. There is also provided an aspheric lens at the front of the photoflash light source for enhancing the light intensity. The aspheric lens is preferably comparable in width to the width of the back reflector surface. In accordance with the invention it is preferred that the housing means and aspheric lens be formed as a unitary capsule (or cell) with the reflector surface at one side thereof and the aspheric lens at the opposite front side thereof. The reflector surface is preferably spherical for highly specular surfaces but may be flat for highly diffuse surfaces and there are also provided reflector surfaces at both ends of the capsule. Furthermore, the lens portion of the capsule also has at both ends, refractive lens surfaces.

There are described herein basically two embodiments of the present invention. In one embodiment, the means securing the light source includes a glue for fusing the source to both reflector and lens. In the alternate embodiment, there is instead defined an air gap interface between the light source and the lens and reflector. The photoflash lamps of this invention are preferably disposed in an array of a plurality of such capsules further including lamp-firing circuitry and means connecting the light source of each capsule to the lamp firing circuitry, including an array holder.

BRIEF DESCRIPTION OF THE DRAWINGS

FIG. 4 is a side elevation view of an alternate embodiment of a capsule array holder;

FIG. 5 is a cross-sectional view of the lamp capsule of FIG. 1 as taken along the line 5—5 in FIG. 1;

FIG. 6 is a fragmentary cross-sectional view of the lamp capsule as depicted in FIG. 1 and as taken at the left end of the capsule of FIG. 1;

FIGS. 7A, 7B and 7C disclose alternate configurations for the end refractive surfaces of the aspheric lenses shown in FIGS. 1 and 5;

BEST MODE FOR CARRYING OUT THE INVENTION

For a better understanding of the present invention together with other and further objects, advantages and capabilities thereof, reference is made to the following disclosure and dependent claims in connection with the above-described drawings.

With regard to the drawings, there is shown basically two embodiments of the present invention but also illustrating a number of different versions of the invention, particularly as it relates to lens shapes and configurations. All of the optical systems and apparatus described are adapted for improving the center beam candle power seconds and zonal lumen seconds of a flash lamp when flashed within the unit's housing. The first embodiment of the invention is illustrated in FIGS. 1–7 while the second embodiment employing an air interface is illustrated in, for example, FIGS. 8 and 10.

Figure 1:
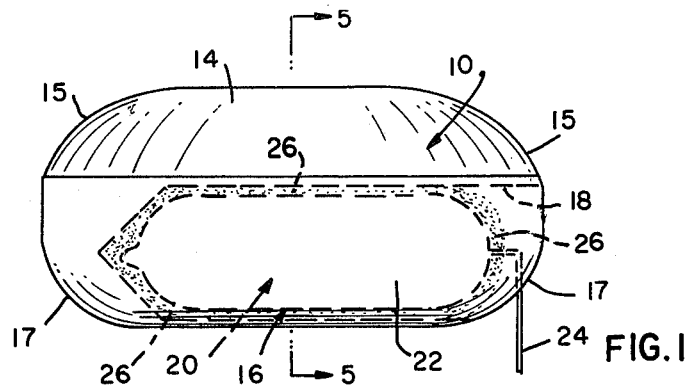
FIG. 1 is a side elevation view of a lamp capsule constructed in accordance with the principles of the present invention.

With regard to the first embodiment, the lamp source is fused to the reflector and lens by means of a glue while the second embodiment has an air interface between the source and the optical elements. The first embodiment, such as shown in FIGS. 1 and 5, is in the form of an integral, insulative capsule (or housing) 10. These capsules are molded in arrays, as shown for example, in FIG. 2, where four capsules are depicted. The capsule is preferably made of a plastic, is preferably clear, and may be made of such plastics as styrene or plexiglass. Capsule 10 comprises a front aspheric lens 14 having a reflector 16 located on a back reflector surface thereof. The front lens, as mentioned, is aspheric in cross-section (see FIG. 5) while the rear reflector is, at least at its center section, substantially spherical in cross-section. The capsule 10 is also provided with an opening 18 which is dimensioned to somewhat loosely receive the flash lamp 20. The flash lamp 20 typically includes a light transmitting envelope 22 and a pair of lead-in wires 24. Located within the envelope is a quantity of shredded combustible material 25 such as zirconium or hafnium.

The lens 14 as illustrated in FIG. 1 also has spherical end lens surfaces 15. Similarly, the reflector 16 has spherical end reflector surfaces 17.

Figure 17:
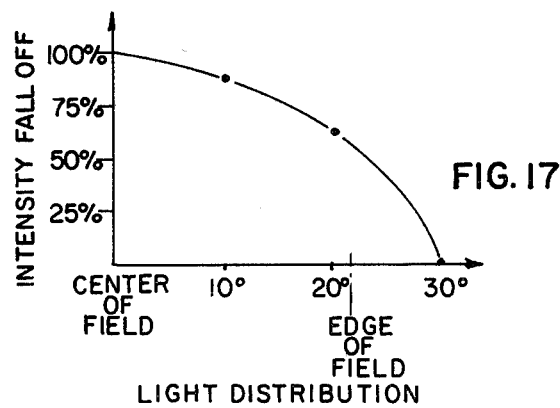
FIG. 17 is a graph associated with the capsule of the present invention plotting intensity distribution over the desired field.

The lamps that are employed in the present invention may be of conventional design and include the aforementioned typical shred burning material. Certain criteria for the shred are discussed in detail hereinafter. The aspheric lens integrated as part of the overall lamp capsule (either secured to or forming part of the plastic housing) provides for shred magnification so that the shred gives an appearance in front of the lamp as filling substantially the entire capsule (cell) width. This provides for a maximum transfer of light to the subject on the capsule's central axis. Off axis, such as illustrated in FIG. 17, for example, at 20° off of the center of the field, the lens is still ⅔ (about 66 percent) filled, therefore providing at least about 66 percent of the maximum light output even at this substantial deviation off of the center of the field.

As mentioned previously, the first embodiment of the invention is characterized by the light source being fused to the reflector and lens by means of a glue 26. The first embodiment wherein the lamp is glued and thus encapsulated is particularly advantageous in preventing highly loaded lamps from failing by an explosion. In forming the capsule array 12 of FIG. 2, a small amount of glue 26 is placed in the bottom of each opening 18 and the lamp is then forced down into the opening 18. The glue fills all of the irregularities and voids in the opening, including the spacing and between the plastic capsule and the outer surface of the envelope of lamp 20. The lamp is thus an integral part of the optical and other parts of the completely assembled unit. The glue 26 may be a clear epoxy or a UV curing glue. It may also contain filter material to adjust the color temperature.

Figure 2:
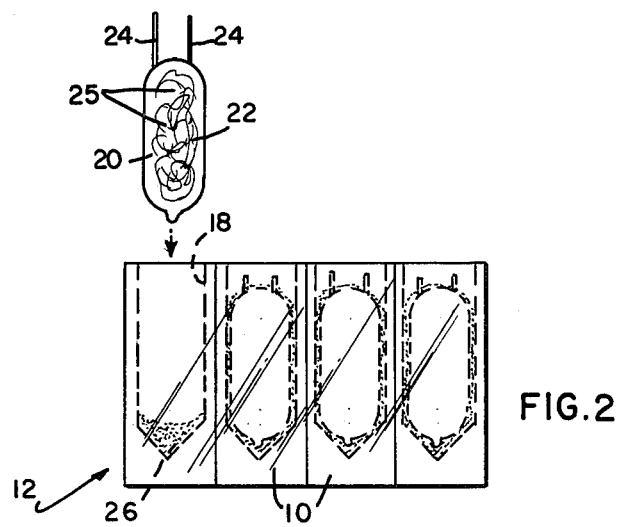
FIG. 2 shows a lamp capsule array employing four capsules and indicating the step of securing one of the flash lamps into its accommodating optical capsule.
Figures 3A, 3B:
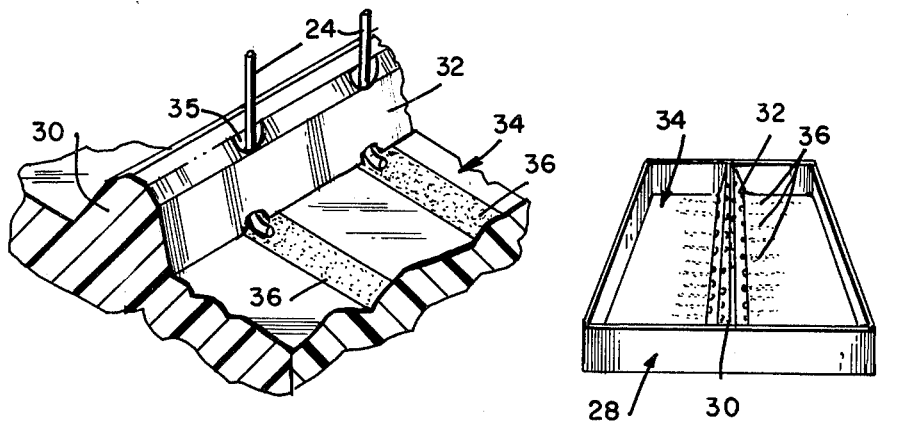
FIGS. 3A and 3B depict an array holder for one or more capsule arrays also illustrating the connector arrangement.

The planar array or bank 12 of lamps depicted in FIG. 2 are now safely and economically insertable within a holder. The holder 28 for the lamp array is depicted in FIGS. 3A and 3B as comprising an outer containing vessel, a center support (30), and a plurality of connecting strips (32). The base of the holder 28 is a circuit board 34 having circuit conductors 36 thereon. The leads 24 of the lamp 20 are forced into the mechanical connector 32 supported in the array holder 28. There are preferably provided conically shaped holes 35 in the connector strip 32, said holes tapering down to approximately the lamp lead wire diameter adjacent the printed circuit conductors 36. The connector board 34 may be bonded to the array after the lead-in wires are in place. The leads 24 are then pushed into or on top of the conductor strips 36. The arrangement depicted in FIGS. 3A and 3B may be used for aligning 8, 16, or more leads into the electrical circuit, depending on the number of lamps used. Between four and ten such lamps are preferably utilized.

Figure 16:
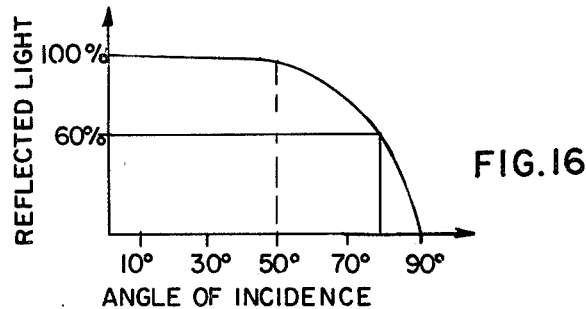
FIG. 16 is a graph associated with FIG. 9 plotting reflected light versus angle of incidence.

FIG. 4 illustrates a slightly different version of arranging the individual lamp capsules. In this view, two capsules are oriented and connected in an end-to-end arrangement (array). Each of these has a pair of leads 24 projecting therefrom (shown in FIG. 4 as only a single lead). FIG. 4 also shows an array holder 29 schematically illustrating end connector strips 31 adapted to respectively receive end lead wires of the dual bank of lamp capsules 10. Associated with the holder 29 is an electrical connector 33. This arrangement is adapted for use with cameras with the connector being either a male or female plug. The lamp firing circuitry may be wired to work forward or backward. In this way if one fails, the operator may rotate the array to bypass a bad circuit. With reference to FIG. 5, there is illustrated the cross-sectional construction taken along line 5—5 of FIG. 1 showing the different lens and reflector surfaces of interest, including the lamp-optics interface surfaces. It is noted in FIG. 5 tnat the rear reflector surface is provided with a reflective coating 40 (e.g., aluminum). The forward surface (S2) of the lamp capsule is aspheric while the rear surface (S1) of the lens 14 is of spherical configuration. It is understood, however, that the true rear surface of the lens or refractive part of the invention is the internal surface of the glass envelope of lamp 20. This surface is indicated by R1 in FIG. 5. Accordingly, the glass wall of the envelope, in addition to the glue 26 immediately adjacent thereto, provide refractive functions for the instant invention in the preferred embodiment. With regard to light reflected from the reflector (coating 40), it is understood that this light is subjected to a double refraction in that it passes through the glass envelope, glue and relatively thin plastic layer of capsule 10 after reflection, and then passes through the opposing envelope wall, glue and thicker part of the invention's lens. R2 represents the outer surface of the lamp envelope. The bonding agent or glue 26 between surfaces S1 and R2 may or may not contribute to the system power depending upon the index of refraction of the material. Understandably, the medium between surfaces S1 and S2 functions as the major lens in the preferred embodiment described herein. This lens 14 is adapted to produce a relatively uniform light distribution over the field of view of the camera. This light distribution is shown in FIG. 16.

The reflector portion of the capsule depicted in FIG. 5 can be constructed to be either specular or diffuse. When employing the coating 40 depicted in FIG. 5, the reflector also functions as a barrier to prevent sympathetic lamp flashing. If a diffuse coating is used, it may be applied by dipping or spray painting so long as it covers the surfaces between the cells as illustrated in FIG. 5. In this way, one can maximize the cell volume, because there is no need for a petition between the lamps other than this opaquing film 40.

The reflector optics, similar to a mangin mirror, may be constructed either to transmit the light back through the source or alternatively around the source, depending upon the following factors. The flash lamp array in one embodiment has a desired size for an eight-lamp array of only 1.08 inch by 1.31 inch by 0.334 inch. If the diameter of the capsule approaches approximately twice the diameter of the inner part (core) 18 of the lamp, then it is beneficial to transmit the light around the bulb core. In the above referred-to eight-lamp version, a desired inner core diameter is 0.175 inch, yielding a ratio of about 1.5. Thus, the light is directed back through the lamp. In this case the gain of the optical system is about 2.1.

In a second example, the array size is the same but the number of lamps is ten instead of eight. The inner bulb core size is therefore 0.120" yielding a ratio of 1.8. In this case, a diffuse back reflector is used which scatters light both through and around the lamp. The gain for this encapsulating system is 2.3.

When transmitting light through the lamp, several factors are to be taken into account, as follows:

1. The density of the lamp shred is low so that the reflector is able to transmit light back through the burning shred.

2. The shred is distributed uniformly throughout the capsule.

3. The burning material should be as bright as possible and the material in order of preference is hafnium, zirconium, and aluminum at the proper shred size and oxygen pressure.

4. The amount of shred material should be between 2 and 8 milligrams.

5. The shred material should be selected so that most of the burning is completed by the time the camera shutter closes.

6. The optical gain is to be maximized.

The above factors are important for the performance of the lamp apparatus in producing a gain. The light from the burning shred hits the reflector and is transmitted through the bulb and lens. By adjusting the power of the mirror, the field uniformity can be readily modified.

FIG. 6 illustrates focusing at the ends of the capsule. The light from the ends are focused by both the spherical reflective surfaces 17 and the spherical refractive end surfaces 15. Some light from the bottom of the end of the lamp is reflected by surface 17 and then refracted by surface 15 to the field pattern. This is indicated by the solid rays 44 in FIG. 6. Another portion of the light from the top end of the lamp is transmitted in a refractive manner directly from the surface 15. This is shown by the dotted rays 42 in FIG. 6. It should be noted that some light from surface 17 is transmitted directly through the capsule without being scattered or refracted. This is due to the bonding agent or glue 26 having a similar index to that of the bulb envelope.

Three examples of the refractive end surfaces 15 are shown in FIGS. 7A, 7B and 7C. With these surfaces, there is an improvement of about ten to twenty percent of the light over the field. FIG. 7A has actually a dual end surface including surfaces 15A and 15B. Surface 15A directs rays from the rear reflector to the field of view. Surface 15B is steeper and is for bending rays from the top of the lamp to the field of view. FIG. 7B shows a lens with end surfaces 15 substantially the same as shown in FIG. 1. FIG. 7C shows a lens wherein the end surfaces 15 are substantially flat and taper as shown therein.

Figure 8:
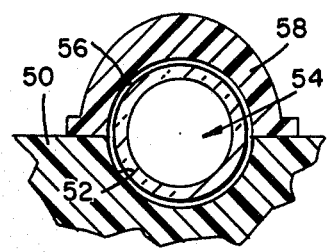
FIG. 8 is a cross-sectional view taken in the manner of the cross-sectional view of FIG. 5 but for a second embodiment of the invention employing an air interface between the photoflash lamp and the optical elements (lens and reflector)

With regard to the second embodiment of the invention, reference is directed to FIG. 8. This embodiment of the invention as will be understood, relates primarily to coated lamps (those having a containment coating, e.g., cellulose acetate, thereabout). This second embodiment has an air interface between the source and the optical elements. This air interface tends to reduce aberrations by adjusting the power of the lens surfaces. With this embodiment, the highest gain that was measured was 2.6. The air interface embodiment illustrated in FIG. 8 is made possible by use of a support (and reflective) member 50 which may be made of a white styrene material having an opening 52 adapted to receive the light source 54. The diameter of the opening 52 may be approximately 0.188 inch. The source 54 may be supported in the opening 52 to a depth of 0.094 inch. As depicted in FIG. 8, there is provided an air gap 56 between the lamp envelope and both the opening 52 and the lens 58. In the embodiment of FIG. 8, the lens has an inner diameter of 0.188 inch to correspond with the diameter of the opening 52. The envelope of the light source 54 has an inner diameter of 0.140 inch and an outer diameter of 0.175 inch. With these dimensions, the width of the air gap 56 is on the order of only about 0.013 inch. Although not specifically illustrated in FIG. 8, some type of support means such as a spacer is provided between the source and optics for properly supporting the light source and providing the interfacing air gap. In the embodiment of FIG. 8, the optical gain of the source and lens is about 1.8. The gain of the source and reflector is 1.7. The scattering light rays off of the side of the capsule assist to increase the gain. The gain of the total system is 2.6. It is noted that the individual gains mentioned hereinbefore are not additive to provide the total system gain.

Figure 9:
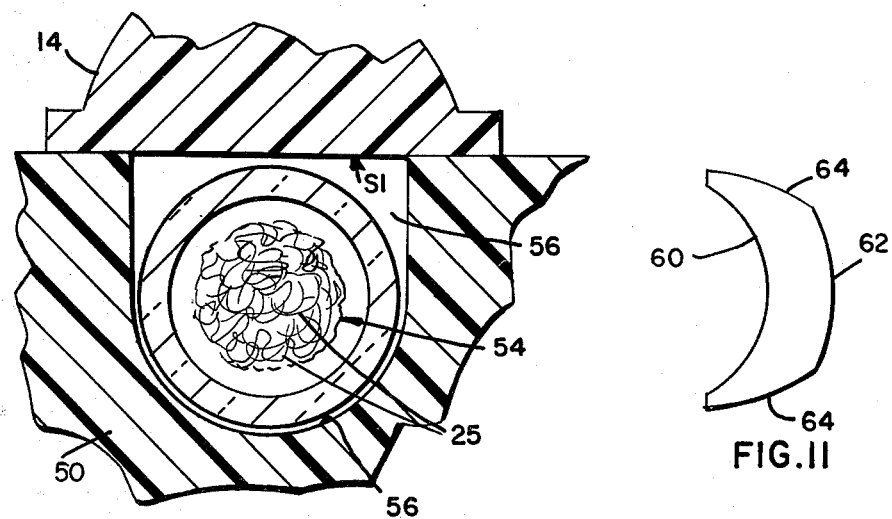
FIG. 9 is an illustration of the second embodiment of FIG. 8 illustrating light reflection at high angles of incidence.

As understood herein, the rear surface S1 of the refractive element, such as illustrated in FIG. 9, is used to adjust the light gathering power of the lens in two basic ways. First, this surface functions to define the degree of bend of the light impinging thereon. Secondly, it serves to define the amount of reflected light, particularly at the high incidence angles. As discussed and understood herein, therefore, it is a highly desired characteristic of the invention to provide this surface (S1) in curved form in order to reduce reflection (and therefore increase refraction) of light impinging thereon. A planar rear surface (FIG. 9) can be successfully utilized herein, however, but the curved embodiments defined herein (e.g., FIGS. 5 and 8) are most preferred. To support this, it can be seen in FIG. 16 that approximately 4 percent of the light is reflected at normal incidence to planar surface S1, while 60 percent is reflected at 80 degrees which occurs at the edge of the cell. An angle of 50 degrees incidence or less is a good design criteria and the lens as depicted in FIGS. 8, 10 and 11 have been designed in accordance with that criteria.

Figure 10:
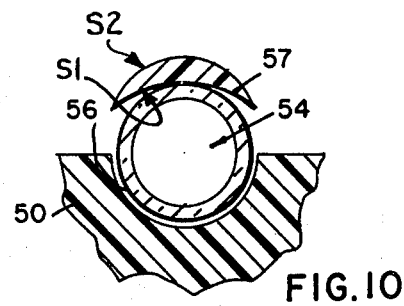
FIG. 10 schematically illustrates another version of the second embodiment of the invention employing a differently shaped lens.

FIG. 10 illustrates a different version for the second embodiment of the invention employing the air gap 56. This version also employs the support member 50 but instead of using the aspheric lens 58 of FIG. 8, there is employed a double spherical lens 57. As also shown in this view, it is possible for the external surface of the flashlamp to engage the internal lens surface. This can occur at a single point, as shown in FIG. 10. In one example of the embodiment depicted in FIG. 10, the radius of outer surface S2 was about 0.125 inch while that of internal surface S1 was about 0.250 inch. A center (maximum) thickness of about 0.092 inch was used.

Figure 11:
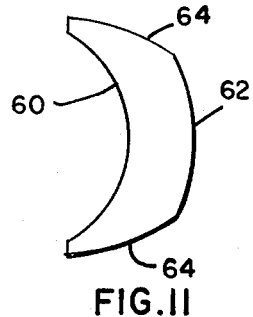
FIG. 11 is still another version of the lens that may be used in the embodiment of FIGS. 8 and 10.

FIG. 11 shows still another version of a lens that may be employed in this invention. This includes a spherical rear surface 60 and two front surfaces including spherical surface 62 and a parabolic surface 64. This configuration can produce relatively high corner-to-center ratios, e.g., greater than one.

Figure 12:
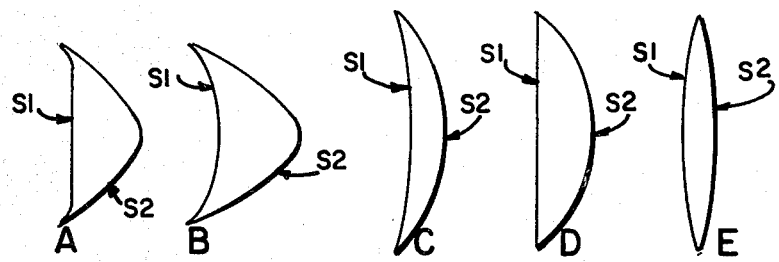
FIG. 12 shows a number of different versions of lenses that may be employed in the embodiment of FIG. 8 showing different configurations for front and rear lens surfaces.

FIG. 12 illustrates several different configurations for the refractive lens used in this invention. In FIG. 12 there are shown versions 12A–12E. Surface S1 is the rear surface of the lens and surface S2 is the front surface in each of these versions. All of these lenses produce, if fully flashed, the same center beam candle power, but the off-axis intensities are different in the different versions of FIG. 12. The versions of FIGS. 12C, 12D and 12E have spherical surfaces S1 while the version of FIG. 12B has one aspheric surface S2. The version in FIG. 12A has two aspheric surfaces S1 and S2. The highest uniformity is achieved with the embodiment of FIG. 12A. The next best versions as far as uniformity is concerned are those in FIGS. 12B, 12C and 12D. The lowest uniformity is found in the version of FIG. 12E.

Figure 13A:
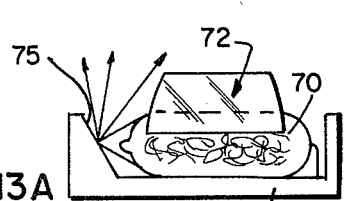
FIGS. 13A and 13B show the use of reflective mirrors in a lamp capsule usable with either a specular or diffuse mirror.
Figure 13B:
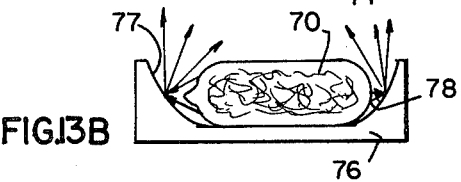

FIGS. 13A and 13B show two further versions of the present invention including mirrors. Thus, in FIG. 13A there is shown the lamp 70 with associated lens 72 which preferably is an aspheric lens. The lamp 70 is disposed within a housing 74 having at one end a mirror surface 75. The embodiment of FIG. 13B also includes a lamp 70 and a housing 76 having at opposite ends mirror surfaces 77 and 78. In these embodiments, light from the ends of the lamp is redirected by either a specular or diffuse mirror as evidenced by the mirror surfces 75, 77 and 78.

Figure 14:
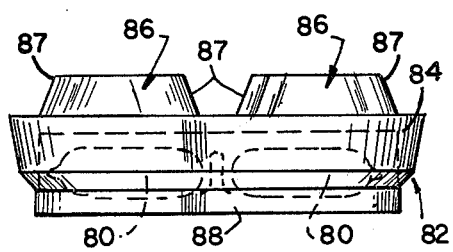
FIG. 14 illustrates the use of a prism in combination with the lamp capsule.
Figure 15:
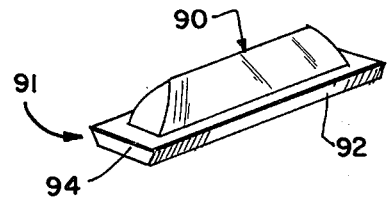
FIG. 15 is a perspective view showing the use of a prism at the edge of the lens.

FIGS. 14 and 15 illustrate the use of prisms in association with the capsules of this invention. Thus, in FIG. 14 there is shown a pair of lamps 80 contained within a housing 82. Associated with the housing 82 is a coated prism 84. Also disclosed are a pair of lenses 86, each associated with one of the lamps 80 therebelow. It is noted that the lenses 86 preferably have steep angle end refractive lens surfaces 87. Associated with the housing 82 is also a circuit board 88.

FIG. 15 is a perspective view illustrating a lens 90 having disposed substantially integral therewith prism means 91 including a side prism 92 and an end prism 94. In the embodiment of FIG. 15 the use of the prisms have been found to redirect from about ten to twenty percent of the lamp output.

While there have been shown and described what are at present considered the preferred embodiments of the present invention, it will be obvious to those skilled in the art that various changes and modifications may be made therein without departing from the scope of the invention as defined by the appended claims.

I claim:
1. A photoflash unit comprising:
an electrically insulative, light-transmitting housing having an elongated opening therein and defining a back reflector surface thereon relative to said elongated opening;
a curved reflector located on said back reflector surface;
at least one flash lamp located within said opening of said housing adjacent said curved reflector and including an elongated, light-transmitting envelope having a quantity of combustible, light producing material therein, the width of said flash lamp being slightly narrower than the width of said curved reflector;

means for securing said flash lamp within said opening of said housing; and a single lens member located on or forming part of a front portion of said housing adjacent said elongated opening and relative to said reflector to enhande on-axis and off-axis light intensity from said flash lamp upon ignition thereof within said housing, said lens including a curved, forward outer surface and a curved, rear inner surface located immediately adjacent said light-transmitting envelope of said flash lamp, said outer surface being of either aspheric or spherical configuration in cross section.

2. The photoflash unit according to claim 1 wherein said flash lamp is electrically activated and includes a pair of conductive lead-in wires projecting from an end portion of said elongated envelope, said lead-in wires adapted for being electrically connected to a power source for activating said lamp.

3. The photoflash unit according to claim 1 wherein said insulative housing is plastic.

4. The photoflash unit according to claim 1 wherein said curved reflector in cross section is of a substantially spherical configuration and said curved, rear inner surface of said lens member in cross section is of a spherical configuration.

5. The photoflash unit according to claim 4 wherein said curved reflector further includes curved first and second end reflective surfaces, each of said end surfaces located at opposing ends of said insulative housing relative to said elongated opening.

6. The photoflash unit according to claim 5 wherein each of said end surfaces in cross section is of a substantially sperical configuration and is oriented adjacent a respective end portion of said elongated envelope of said flash lamp located within said elongated opening of said housing.

7. The photoflash unit according to claim 1 wherein said lens memmber further includes first and second curved end surfaces, each of said surfaces located at one end of said lens member and adjacent a respective end portion of said flash lamp when said flash lamp is located within said elongated opening of said housing.

8. The photoflash unit according to claim 7 wherein each of said end surface of said lens member in cross section is of a spherical configuration.

9. The photoflash unit according to claim 1 wherein the width of said lens member is comparable to said width of said curved reflector.

10. The photoflash unit according to claim 1 further including an air gap interface within said housing, said interface located between the external surface of said envelope of said flash lamp and said curved, rear inner surface of said lens member.

11. The photoflash unit according to claim 10 wherein said air gap interface is further located between said external surface of said envelope and the internal surface of said curved reflector.

12. The photoflash unit according to claim 1 wherein said means for securing said flash lamp within said opening of said insulative housing is glue, said glue fusing said flash lamp to said aspheric lens and said housing.

13. The photoflash unit according to claim 1 wherein the number of flash lamps is between four and ten, each of said lamps oriented within a corresponding one of said openings within said insulative housing and including one of said lens members and one of said reflectors adjacent said opening to define a plurality of individual capsules, said capsules being disposed in an integral capsule array.

14. The photoflash unit according to claim 13 wherein said array is substantially planar.

15. The photoflash unit according to claim 13 wherein each of said flash lamps is electrically activated and includes a pair of electrically conductive lead-in wires projecting from an end portion of said elongated envelope, said unit further including a holder having a base portion including a plurality of conductor strips thereon and means for connecting each of said lead-in wires of each of said flash lamps to a respective one of said conductor strips, said lamps located within said holder.

16. The photoflash lamp unit according to claim 1 wherein said reflector is in the form of a coating located on said back reflector surface of said housing.

17. The photoflash unit according to claim 1 wherein said lens member provides an off-axis light distribution such that at least about 66 percent of maximum center axis light intensity is realized at about 20 degrees off-axis.

18. The photoflash unit according to claim 15 wherein said holder includes a center support portion having a plurality of conical-shaped holes therein, each of said lead-in wires of said flash lamps being positioned within a respective one of said holes and in contact with said respective conductor strip.

19. The photoflash unit according to claim 1 wherein said curved reflector reflects light from said flash lamp both through and around said flash lamp.

20. The photoflash unit according to claim 1 wherein said curved reflector reflects light from said flash lamp through said flash lamp.

* * * * *